(12) United States Patent
Terashi et al.

(10) Patent No.: US 6,728,185 B2
(45) Date of Patent: Apr. 27, 2004

(54) DEVICE FOR ASSEMBLING AND ADJUSTING AN OPTICAL UNIT

(75) Inventors: Taro Terashi, Tokyo (JP); Hisayoshi Ohshima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 09/981,868

(22) Filed: Oct. 19, 2001

(65) Prior Publication Data

US 2002/0048234 A1 Apr. 25, 2002

(30) Foreign Application Priority Data

Oct. 20, 2000 (JP) .................................... 2000-320217

(51) Int. Cl.$^7$ ................................................ G11B 3/90
(52) U.S. Cl. ................................ 369/53.28; 369/112.15
(58) Field of Search ........................ 369/44.11, 44.23, 369/44.27, 44.29, 44.35, 53.19, 53.23, 53.25, 53.28, 103, 112.1, 112.15

(56) References Cited

U.S. PATENT DOCUMENTS 5,708,633 A * 1/1998 Hollen et al. ............ 369/44.11
6,266,302 B1 * 7/2001 Yamanaka ................ 369/44.23
6,442,110 B1 * 8/2002 Yamamoto et al. ...... 369/44.23

* cited by examiner

Primary Examiner—Paul W. Huber
(74) Attorney, Agent, or Firm—Oblon, Spivak, McClelland, Maier & Neustadt, P.C.

(57) ABSTRACT

A device for assembling and adjusting an optical unit of the present invention includes an adjusting device including a collimator lens, an object lens, a disk, and a signal sensing system. A light beam output from the optical unit is incident to the collimator lens. Parallel rays output from the collimator lens are incident to the object leans. Further, a spot converged by the object lens is incident to the disk. The signal sensing system receives a light beam reflected by the disk via the object lens to thereby determine a distance between the object lens and the disk and a positional relation between the spot on the disk and the groove of the disk. The device allows the position of a light emitting element to be accurately determined and therefore allows the angular deviation of the intensity distribution of the light emitting element from a designed value to be easily grasped.

19 Claims, 4 Drawing Sheets

POSITION VS. FOCUS SIGNAL
(S-CURVE)

DEVICE FOR ASSEMBLING AND ADJUSTING AN OPTICAL UNIT

BACKGROUND OF THE INVENTION

1. Field of the Invention

The present invention relates to a device for assembling and adjusting an optical pickup or similar optical unit.

2. Description of the Background Art

Generally, an optical pickup includes a laser diode (LD) or similar light emitting element, an object lens for converging light issuing from the laser diode, a photodetector to which a reflection from a disk is incident, and various optical parts arranged on an optical path extending from the laser diode to the disk. The optical pickup selectively records or reproduces information in or out of the disk. It is a common practice with the optical pickup to package the laser diode, a hologram element and the photodetector into an HOE-LD (Hologram Element-Laser Diode) unit assembled and adjusted beforehand. This promotes easy assembly and adjustment of the optical pickup.

The prerequisite with the HOE-LD unit is that the laser diode, hologram element and photodetector be accurately positioned relative to each other. To adjust the relative position, optics equivalent to or comparative in effect with the optics of the optical pickup may be used, as proposed in the past. In this case, assembly and adjustment are effected by using light issuing from the laser diode of the unit as a reference.

Japanese Patent Laid-Open Publication No. 8-111026, for example, discloses an adjusting device for an optical pickup including a light emitting element, a photodetector, a collimator lens, a reflection surface, an object lens, and an optical device made up of a diffraction grating and a hologram element. A reflection derived from light issuing from the light emitting element is incident to the photodetector. The collimator lens collimates the light issuing from the light emitting element to thereby output parallel rays. The reflectIon surfaced reflects the light issuing from the light emitting element. The optical device inputs the light from the light emitting element to the object lens while inputting the reflection from the reflection surface to the photodetector.

In the prior art adjusting device described above, the collimator lens outputs ideal parallel rays while the focus of the object lens coincides with the reflection surface. In this condition, light with the maximum intensity is incident to the photodetector. The optical device made up of the diffraction grading and hologram element is rotated about the optical axis such that the same intensity of light is incident to the photodetector when the object lens is moved by +L and −L in the direction of optical axis. With this prior art scheme, however, it is extremely difficult to implement ideal parallel rays with the collimator lens or to adjust the optics, which is equivalent to or comparable in effect with the optics of the optical pickup, to the focus of the object lens.

SUMMARY OF THE INVENTION

It is an object of the present invention to provide a device including adjusting optics capable of easily adjusting an optical unit.

In accordance with the present invention, a device assembles and adjusts an optical unit, which includes at least one light emitting element and at least one photodetector mounted on a single case, such that the hologram element is so positioned as to implement a desired signal characteristic. The device includes a collimator lens to which a light beam output from the optical unit is incident, an autocollimator to which parallel rays output from the collimator lens are incident, and an adjusting mechanism including the collimator lens and autocollimator. The device determines the position of the light emitting element.

Also, in accordance with the present invention, a device assembles and adjusts an optical unit, which includes at least one light emitting element and at least one photodetector mounted on a single case, such that the hologram element is so positioned as to implement a desired signal characteristic. The device includes a collimator lens to which a light beam output from the optical unit is incident, a quadrisected photodetector to which parallel rays output from the collimator lens are incident, and an adjusting mechanism including the collimator lens and quadrisected photodetector. The device determines the angular deviation of the intensity distribution of the light emitting element.

Further, in accordance with the present invention, a device for assembling and adjusting an optical unit of includes an adjusting device including a collimator lens, an object lens, a disk, and a signal sensing system. A light beam output from the optical unit is incident to the collimator lens. Parallel rays output from the collimator lens are incident to the object leans. Further, a spot converged by the object lens is incident to the disk. The signal sensing system receives a light beam reflected by the disk via the object lens to thereby determine a distance between the object lens and the disk and a positional relation between the spot on the disk and the groove of the disk. The device allows the position of a light emitting element to be accurately determined and therefore allows the angular deviation of the intensity distribution of the light emitting element from a designed value to be easily grasped.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
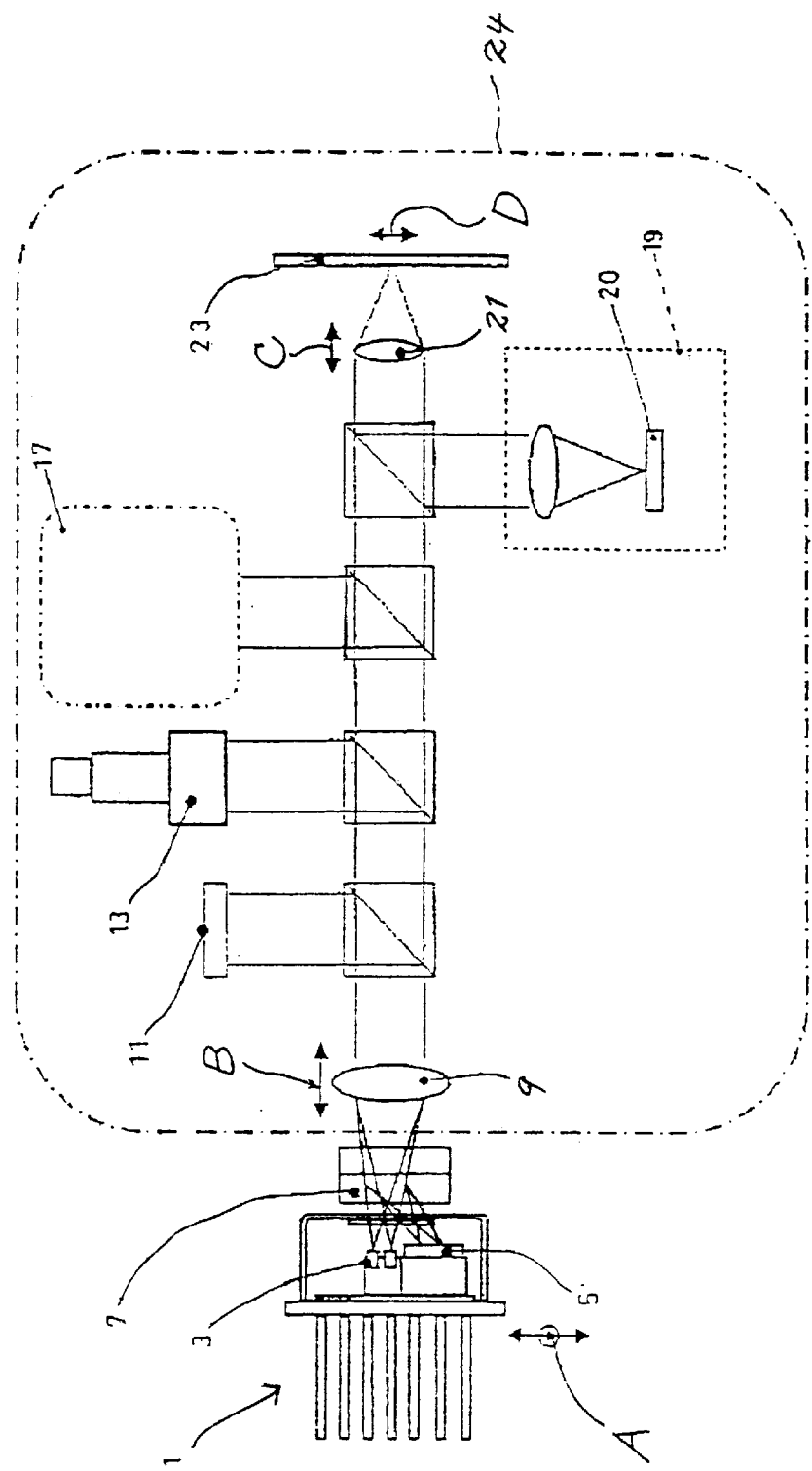
FIG. 1 is a view showing an assembling and adjusting device for an HOE-LD unit embodying the present invention.

Referring to FIG. 1 of the drawings, an HOE-LD unit to which the present invention is applied is shown and generally designated by the reference numeral 1. As shown, the HOE-LD unit 1 includes a laser diode or light emitting element 3, a photodetector 5, and a hologram element 7. The laser diode 3 and photodetector 5 are positioned on a unit case relative to each other. The hologram element 7 is positioned such that a preselected light beam returns on the basis of the light output from the laser diode 1. The HOE-LD unit 1 may include two or more laser diodes 3, if desired.

An assembling and adjusting device embodying the present invention, generally 24, includes optics including a collimator lens 9 to which a light beam output from the HOE-LD unit 1 is incident. Parallel rays output from the collimator lens 9 are input to an object lens 21. A spot converged by the object lens 21 is incident to an optical disk 23.

An autocollimator 13 is positioned at the rear of the collimator lens 9 in order to determine the position of the laser diode 3. A prism, for example, should preferably split the light beam output from the collimator lens 9 to the autocollimator 13. The autocollimator 13 must be adjusted in position because the position of the laser diode 3 is determined on the basis of the position of a spot visible via the autocollimator 13. If a master work or similar reference HOE-LD unit 1 is available, then the autocollimator 13 is positioned such that a spot formed by the master work is incident to a preselected position on the autocollimator; usually the spot should preferably be incident to the center of a reticle. If a master work is not available, then it is necessary to match the entire optics of the HOE-LD unit 1, including a stage, to a single reference beam.

A quadrisected photodetector 11 determines the angular shift of the intensity distribution of the laser diode 3. This photodetector 11 is also positioned at the rear of the collimator lens 9 and should preferably be positioned in parallel to the autocollimator 13 by use of, e.g., a prism. The photodetector 11 needs adjustment like the autocollimator 13. Specifically, the photodetector 11 is positioned such that the outputs of its quadrisected portions are equal to each other with respect to reference light.

A moving mechanism, not shown, moves the HOE-LD unit or work 1 in a direction indicated by an arrow A in FIG. 1. The moving mechanism moves the HOE-LD unit 1 in accordance with information output from the autocollimator 13 and quadrisected photodetector 11 so as to locate the laser diode 3 at a preselected position.

A parallel ray sensing means 17 senses the parallel rays being propagated from the collimator lens 9 to the object lens 21 along a forward path. A mechanism, not shown, moves the collimator lens 9 in the direction of optical axis, as indicated by an arrow B in FIG. 1. The parallel ray sensing means 17 maybe implemented by a double knife edge scheme. Alternatively, use may be made of two flat plates each being positioned at a particular angle in a flux to be transformed to parallel rays, in which case interference fringes of the flux will be measured.

A focus/track signal sensing system 19 is positioned on the optical axis of a light beam reflected by the disk 23 via the object lens 21. The focus/track signal sensing system 19 controls a positional relation between the object lens 21 and the disk 23. This system 19 may use any one of conventional sensing methods including an astigmatism method, a knife edge method and a beam size method customary with an optical pickup.

To adjust the distance between the object lens 21 and the disk 23, the illustrative embodiment uses a rough moving mechanism and a fine moving mechanism neither one of which is shown in FIG. 1. The rough moving mechanism moves the object lens 21 in the direction of optical axis, as indicated by an arrow C in FIG. 1. The rough moving mechanism has a broad dynamic range and low resolution and includes a dead zone as to control, e.g., backlash. By contrast, the fine moving mechanism has high resolution and a narrow dynamic range and features rapid response because of an inherently narrow deal zone. The rough moving mechanism may be implemented by a precision stage that drives a ball screw with a stepping motor and includes a translation guide. For the fine moving mechanism, use may be made of a voice coil motor, piezoelectric element or similar actuator.

To adjust a positional relation between the spot on the disk 23 and the groove of the disk 23, too, the illustrative embodiment uses a rough moving mechanism and a fine moving mechanism neither one of which is shown in FIG. 1. The rough moving mechanism is movable along the disk surface (direction of track) and has a broad dynamic range and low resolution and includes a dead zone as to control, e.g., backlash. By contrast, the fine moving mechanism has high resolution and a narrow dynamic range and features rapid response because of an inherently narrow dead zone. The rough moving mechanism may be implemented by a precision stage that drives a ball screw with a stepping motor and includes a translation guide. For the fine moving mechanism, use may be made of a voice coil motor, piezoelectric element or similar actuator.

Figure 2:
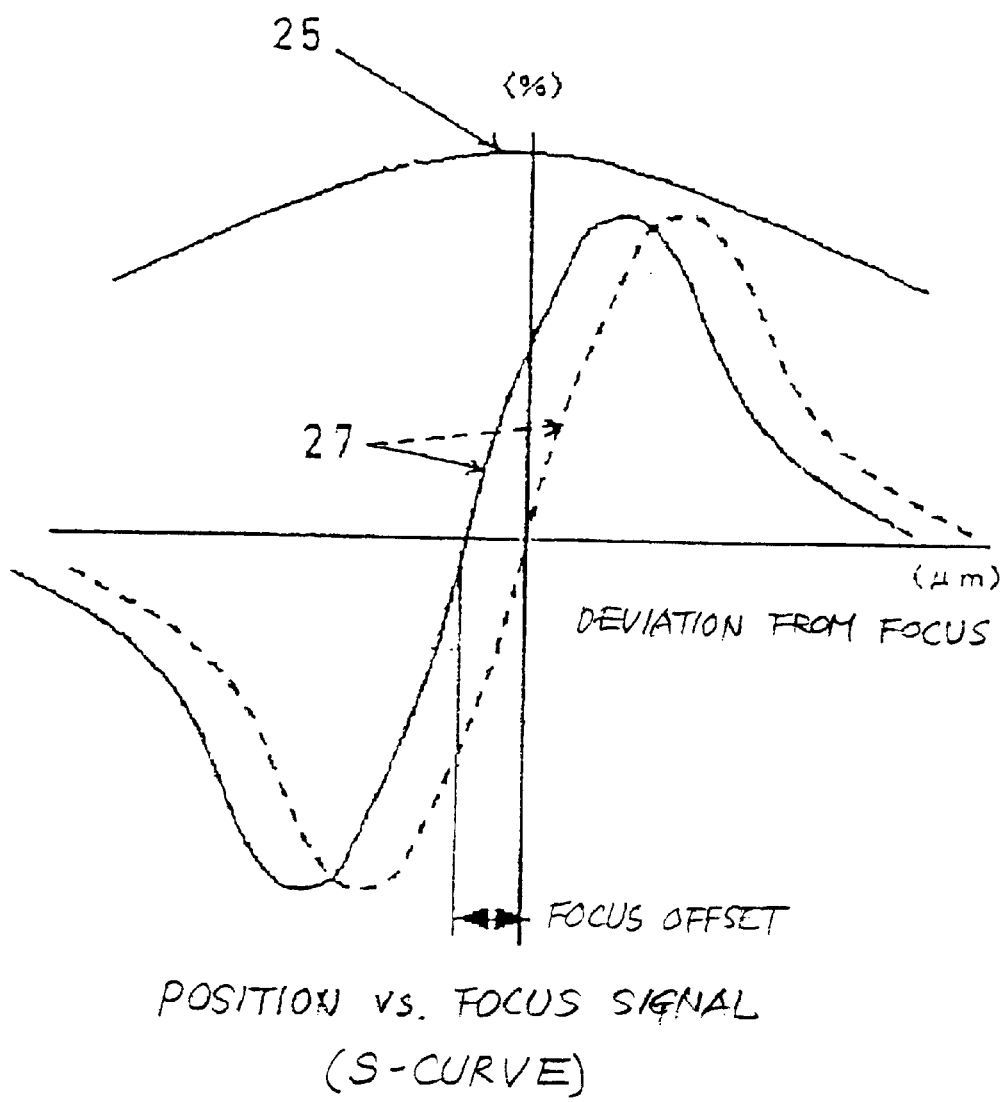
FIG. 2 shows curves showing a specific track signal and a specific focus signal output by a focus/track signal sensing system included in the illustrative embodiment.

In operation, the laser diode 3 of the HOE-LD unit or work 1 is turned on to emit light. The light is focused on the disk 23 in the form of a spot via the hologram element 7, collimator lens 9 and object lens 21. While the rough moving mechanism varies the distance between the object lens 21 and the disk 23, the focus/track signal sensing system 19 senses a focus signal and a track signal. FIG. 2 shows a specific focus signal and a specific track signal sensed by the sensing system 19.

The fine moving mechanism and the signals sensed by the focus/track signal sensing system 19 cooperate to maintain the distance between the object lens 21 and the disk 23 constant by focus servo control. Specifically, the signal sensing system 19, FIG. 1, includes a multi-section photodetector 20. In FIG. 2, a focus point determined on the basis of the peak of a track signal 25 and the zero-crossing point of a focus signal (Fo signal; solid curve) 27 are different from each other by a focus offset. For the focus servo control, the position of the multi-section photodetector 20 is so controlled as to shift the focus signal 27 to a signal represented 27 by a dashed curve. Subsequently, the focus servo control is effected at the zero-crossing point of the shifted focus signal 27 (dashed line), thereby maintaining the distance between the object lens 21 and the disk 23 constant.

Alternatively, the focus servo control may be effected at the value of the focus signal 27 coincident with the focus point determined on the basis of the peak of the track signal 25. Further, the track servo control may be effected by the fine moving mechanism and the signals output from the focus/track signal sensing system 19.

Figure 3:
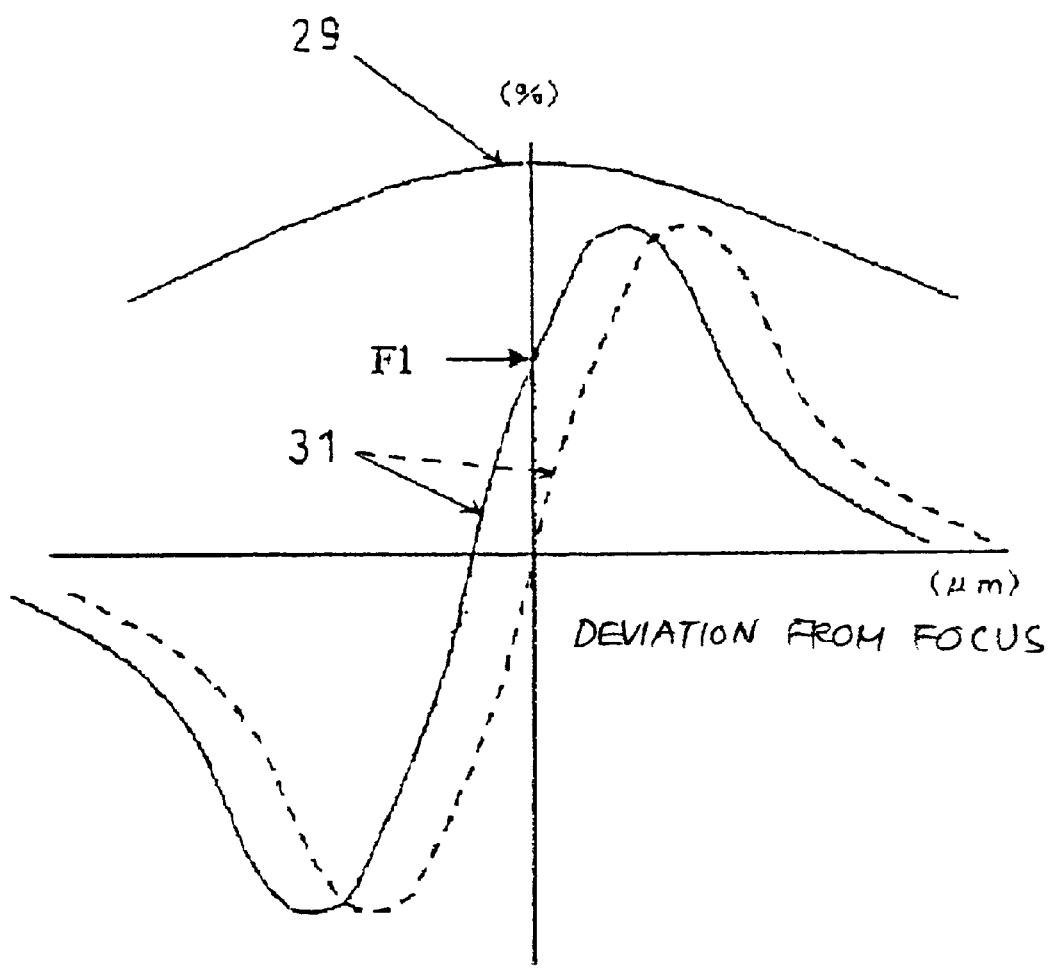
FIG. 3 shows curves showing another specific track signal and another specific focus signal output by the same system.

FIG. 3 shows another specific track signal and another specific focus signal available with the illustrative embodiment.

The construction and adjustment described above realize a highly accurately corrected optical pickup when applied to the assembling and adjusting optics 24. An arrangement may be made such that the light beam returned via the optics is refracted by the hologram element 7 and then incident tot he photodetector 5 of the HOE-LD unit 1. In such a case, the hologram element 1 will be adjusted in position in such a manner as to output a preselected signal and then fixed in place.

Figure 4:
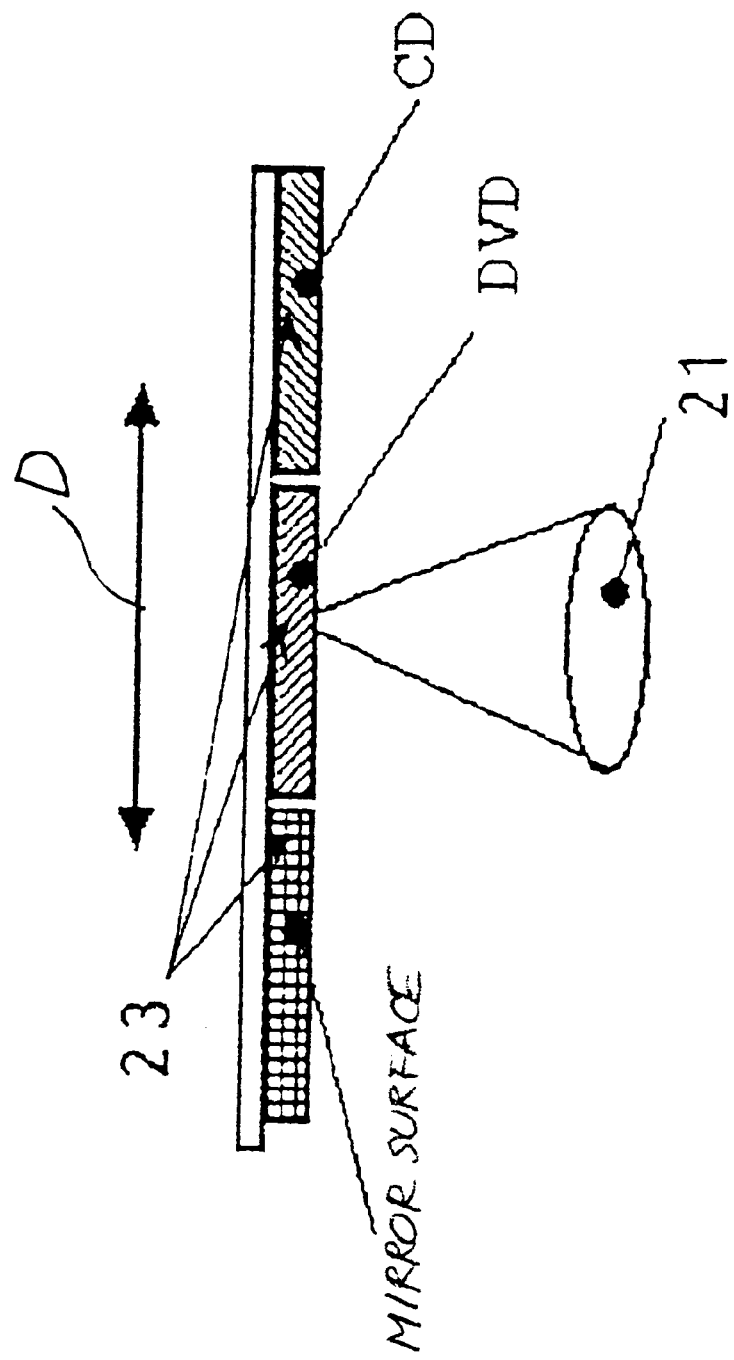
FIG. 4 is a view showing a disk switching function unique to the illustrative embodiment.

As shown in FIG. 4, a plurality of disks of different kinds, e.g., a CD (Compact Disk) and a DVD (Digital Versatile Disk) may be positioned side by side in such a manner as to face the object lens 21. This allows the rough moving mechanism to switch the subject disk to be adjusted. With such a disk switching function, it is also possible to effect adjustment with one kind of disk and then effect adjustment with another kind of disk. Particularly, in the case of an HOE-LD unit having multiple wavelengths, the illustrative embodiment with the disk switching function can execute adjustment and test with multiple wavelengths alone.

In summary, it will be seen that the present invention provides an optical unit assembling and adjusting device having various unprecedented advantages, as enumerated below.

(1) The device allows the position of a light emitting element to be accurately determined and therefore allows the angular deviation of the intensity distribution of the light emitting element from a designed value to be easily grasped.

(2) The device obviates adjustment errors ascribable to the deviation of an optical axis, which is ascribable to the positional error of the light emitting element and that of the entire HOE-LD unit. This promotes accurate assembly and adjustment of the HOE-LD unit. In addition, the device obviates the positional error of a collimator lens ascribable to the above errors.

(3) The device can execute servo control with an object lens without sensing a focus signal or a track signal via a photodetector built in the HOE-LD unit. This insures stable signal sensing without regard to the condition of adjustment.

(4) The device effects accurate assembly and adjustment of the HOE-LD unit that may form part of optics equivalent to an optical pickup.

(5) The device is capable of dealing with a plurality of disks of different standards. Further, with the device, it is possible to determine whether or not the HOE-LD unit is adaptive to a plurality of disks different in standard from a subject disk to be adjusted.

Various modifications will become possible for those skilled in the art after receiving the teachings of the present disclosure without departing from the scope thereof.

What is claimed is:

1. A device for assembling and adjusting an optical unit, which includes at least one light emitting element and at least one photodetector mounted on a single case, such that a hologram element is so positioned as to implement a desired signal characteristic, said device comprising:

a collimator lens to which a light beam output from the optical unit is incident;

an autocollimator to which parallel rays output from said collimator lens are incident; and an adjusting device configured to automatically adjust said collimator lens and said autocollimator based on a signal from said autocollimator;

whereby a position of the light emitting element is determined.

2. The device as claimed in claim 1, wherein a positional deviation of the light emitting element and an angular deviation of a flux intensity distribution of said light emitting element are determined to thereby match a position of the optical unit to an optical axis of optics included in said adjusting device.

3. The device as claimed in claim 1, further comprising:

parallel ray sensing means for sensing parallelism of the parallel rays output from said collimator lens; and a moving mechanism for moving said collimator lens in a direction of optical axis;

wherein said moving mechanism moves said collimator lens in accordance with information output from said parallel ray sensing means to thereby adjust the parallel rays.

4. The device as claimed in claim 1, wherein after optics included in said adjusting device has been controlled, a relative position between the light emitting element, the photodetector and the hologram element is adjusted by using the light output from said light emitting element as a reference.

5. A device for assembling and adjusting an optical unit, which includes at least one light emitting element and at least one photodetector mounted on a single case, such that a hologram element is so positioned as to implement a desired signal characteristic, said device comprising:

a collimator lens to which a light beam output from the optical unit is incident;

a quadrisected photodetector to which parallel rays output from said collimator lens are incident; and an adjusting device configured to automatically adjust said collimator lens and said quadrisected photodetector based on a signal from said autocollimator and said quadrisected photodetector, whereby an angular deviation of an intensity distribution of the light emitting element is determined.

6. The device as claimed in claim 5, wherein a positional deviation of the light emitting element and an angular deviation of a flux intensity distribution of said light emitting element are determined to thereby match a position of the optical unit to an optical axis of optics included in said adjusting device.

7. The device as claimed in claim 5, further comprising:

parallel ray sensing means for sensing parallelism of the parallel rays output from said collimator lens; and a moving mechanism for moving said collimator lens in a direction of optical axis;

wherein said moving mechanism moves said collimator lens in accordance with information output from said parallel ray sensing means to thereby adjust the parallel rays.

8. The device as claimed in claim 5, wherein after optics included in said adjusting device has been controlled, a relative position between the light emitting element, the photodetector and the hologram element is adjusted by using the light output from said light emitting element as a reference.

9. A device for assembling and adjusting an optical unit, comprising:

a collimator lens to which a light beam output from the optical unit is incident;

an object lens to which parallel rays output from said collimator lens are incident;

a disk to which a spot converged by said object lens is incident;

a signal sensing system for receiving a light beam reflected by said disk via said object lens to thereby determine a distance between said object lens and said disk, and a positional relation between the spot on said disk and a groove of said disk; and an adjusting device configured to automatically adjust said collimator lens, said object lens, said disk, and said signal sensing system based on a signal from said signal sending system.

10. The device as claimed in claim 9, wherein said signal sensing system comprises:

a rough moving mechanism movable in a direction of optical axis of said object lens and having a broad dynamic range and a low resolution and involving a dead zone as to control; and a fine moving mechanism movable in said direction and having a high resolution and a narrow dynamic range and having high response due to a narrow dead zone;

said rough moving mechanism and said fine moving mechanism cooperating to adjust the distance between said object lens and said disk.

11. The device as claimed in claim 10, further comprising a determining means for determining the distance between said object lens and said disk to thereby detect a focus.

12. The device as claimed in claim 11, further comprising a focus servo control means for determining, when the focus is determined, a difference between a position of a multi-section photodetector included in said signal sensing system and the light beam as a focus signal value and then executing focus servo control in accordance with said focus signal value.

13. The device as claimed in claim 10, further comprising a focus servo control means for executing, while said fine moving mechanism varies the distance between said object lens and said disk, focus servo control in accordance with a focus servo signal output from said signal sensing system to thereby maintain the focus at all times.

14. The device as claimed in claim 9, wherein said signal sensing system comprises a focus servo control adjusting device, when a focus is determined, a position of a multi-section photodetector included in said signal sensing means relative to the light beam, and then executing focus servo control when a focus signal value of said signal sensing system is zero.

15. The device as claimed in claim 9, further comprising:

a rough moving mechanism movable in a direction of track and having a broad dynamic range and a low resolution and involving a dead zone as to control; and a fine moving mechanism movable in said direction and having a high resolution and a narrow dynamic range and having rapid response due to an inherently narrow dead zone;

said rough moving mechanism and said fine moving mechanism cooperating to adjust the positional relation between the spot on said disk and the groove of said disk.

16. The device as claimed in claim 15, further comprising a servo control mechanism for executing, while causing said fine moving mechanism to vary the positional relation between the spot on said disk and the groove of said disk, servo control for maintaining said groove and said spot in coincidence in accordance with a track signal output from said signal sensing system.

17. The device as claimed in claim 15, wherein a plurality of disks are positioned side by side while facing said object lens, said device further comprising a disk switching means for causing said rough moving mechanism to switch a subject disk for adjustment.

18. The device as claimed in claim 17, further comprising a testing means for switching, after adjusting a relative position between a light emitting element, a photodetector and a hologram element by using light issuing from said light emitting element as a reference with the subject disk, and then testing a function with another disk.

19. The device as claimed in claim 9, wherein after optics included in said adjusting device has been controlled, a relative position between a light emitting element, a photodetector and a hologram element is adjusted by using light issuing from said light emitting element as a reference.

* * * * *